Figure 1:
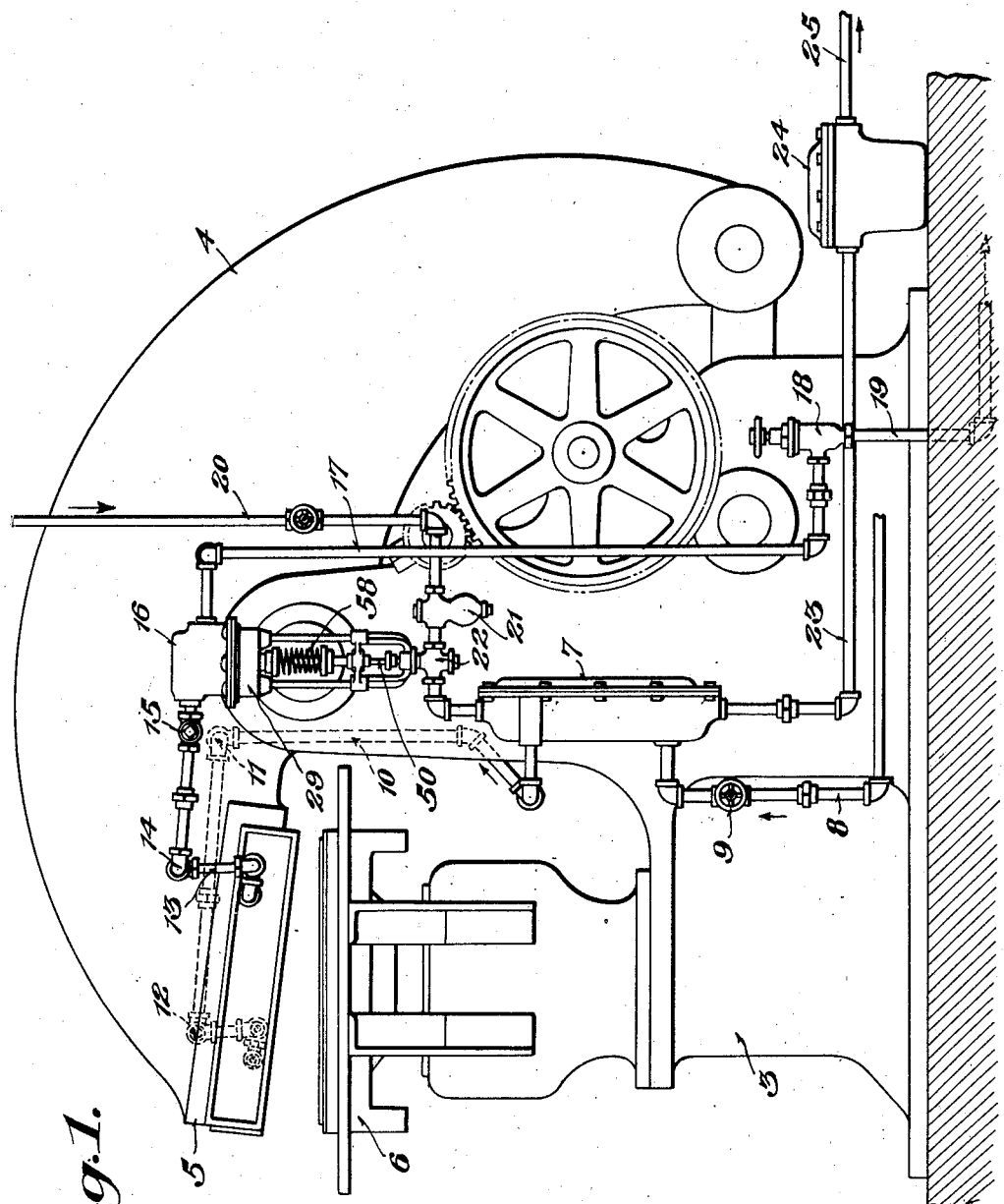

March 26, 1929.  F. C. REEDER  1,706,744
EMBOSSING MACHINE
Filed Aug. 26, 1927  2 Sheets-Sheet 1

Inventor
Frank C. Reeder,
By Cameron, Kerkam & Sutton
Attorneys

Patented Mar. 26, 1929.

1,706,744

UNITED STATES PATENT OFFICE.

FRANK C. REEDER, OF KNOXVILLE, TENNESSEE, ASSIGNOR TO THE FULTON SYLPHON COMPANY, OF KNOXVILLE, TENNESSEE, A CORPORATION OF DELAWARE.

EMBOSSING MACHINE.

Application filed August 26, 1927. Serial No. 215,895.

This invention relates to an embossing machine, and more particularly to means for controlling the temperature of the head or platen of an embossing machine.

It has heretofore been proposed to provide embossing machines, of the type adapted for hot stamping of leather, with steam heated platens or dies. Machines of this character have been unsatisfactory both from the standpoint of temperature regulation and expense of operation.

It is an object of the present invention to provide novel means for controlling the platen temperatures of machines of this character.

Another object of this invention is to provide an embossing machine wherein the die or platen is heated by water and the water heated by steam, the control of the steam supply being effected automatically in accordance with the temperature of the heated water passing through the platen.

Other objects of this invention are to provide a novel heating system which may be readily installed on embossing machines now in use, one which is economical in operation, and one which is adapted to maintain the platen at an even, predetermined and adjustable temperature. These and other objects will appear more fully hereinafter in the detailed description.

The invention is capable of receiving a variety of mechanical expressions, one of which is illustrated in the accompanying drawings, but it is to be expressly understood that the drawings are for purposes of illustration only and are not designed as a definition of the limits of the invention, reference being had to the appended claims for this purpose.

In the drawings,—

Figure 2:
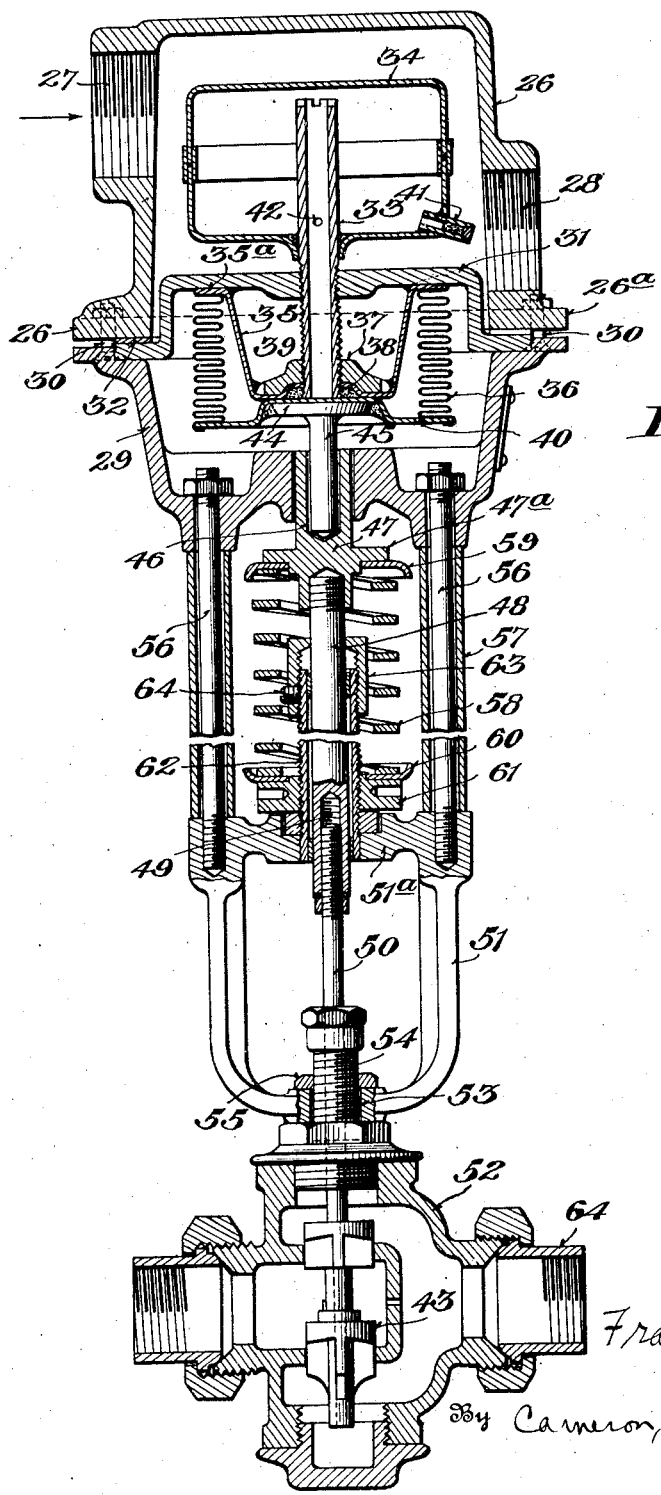

Fig. 1 is a side elevation of one type of embossing machine embodying the present invention; and Fig. 2 is an axial cross-section illustrating one type of thermostatic control means which may be employed in accordance with the present invention.

Referring more particularly to Fig. 1, there is disclosed an embossing machine comprising a base 3 on which is mounted in any suitable manner an overhanging, pivoted head 4 which carries at its upper free end the embossing die or platen 5. Immediately beneath the die 5 is a table or die 6 which receives the leather or other substance to be embossed or pressed. Machines of this character are well known in the art, and the parts so far described per se constitute no part of the present invention.

Suitably mounted on frame 3, or closely adjacent thereto, is a heater 7 through which a liquid such as water is conducted, as by means of pipe 8, a suitable valve 9 being provided in said pipe to control the flow of the water. The heater is preferably of the type wherein the water to be heated circulates through a coil (not shown) in the heater and the heating fluid, such as steam, passes through the shell of the heater, but any suitable construction of heater may be employed.

After being heated the circulating water passes through pipe 10 to the embossing head or die 5. Since the head 5 is movably mounted, while heater 7 and pipe 10 are fixedly mounted, flexible joints 11, 12 of any suitable type are provided along the length of the pipe 10 to permit the connections to be maintained at all times with the head. The means for distributing the heat of the water in die 5 may assume a variety of forms as is well understood in the art. For example, the die may be provided with baffles constituted by interiorly formed ridges or walls, to circulate the heated water so that its heat is distributed uniformly over the lower face of the die, but preferably a flat coil is provided for this purpose. Since heat distributing means of this type are well known in the art, they are not illustrated herein and it will be understood that the term heating coil as employed hereinafter is to be broadly construed to include any of the various suitable types of heat distributing means, such for example as are now employed.

From the heating coil the heated fluid passes through pipe or conduit 13 provided with flexible joints 14, 15 to the upper portion of a thermostatic controlling device 16 to be described more fully hereinafter. From the control device 16 the heated fluid passes through conduit 17, past a relief valve 18, which is preferably set to open at a pressure of 25 pounds, and thence through pipe 19 to the feed water heater of a suitable steam plant for generating the steam employed in heater 7.

The steam for heating the water flowing through the path just described, is supplied by means of pipe 20 that is preferably provided with a strainer 21. From the strainer the steam flows past a valve 22, the movement of the latter being controlled by the thermostatically actuated member 16, as will be described hereinafter, and thence to the casing of heater 7. The exhaust steam passes through conduit 23 to a suitable steam trap 24 and back to the heating plant through pipe 25.

A variety of thermostatically controlled elements may be employed for regulating the amount of steam admitted to heater 7, thereby regulating the temperature of the heating medium passing through the head or die 5. As shown in Fig. 2, the temperature regulator comprises a bowl 26 which may be formed as a casting, and which is provided with threaded openings 27 and 28 to receive the connections or pipes 13 and 17 respectively. A cup-shaped member 29, that may be formed as a casting, is secured, as by means of bolts 30, to the lower flanged portion 26ª of the bowl 26. The chamber formed by bowl 26 and cup 29 is preferably divided into upper and lower compartments by means of a flanged partition member 31, the flange of the latter being clamped between the flanges of the bowl and cup by means of bolts 30. One or more gaskets 32 may be provided between the flanges to insure that the joint will be fluid tight.

The partition 31 is provided with a centrally disposed, threaded opening to receive a threaded tube 33 which may be soldered to the partition if desired, to provide a water tight joint. The upper end of tube 33 extends into the compartment above partition 31 and mounted on tube 33 is a bulb 34, the end of said tube opening into the bulb and terminating near the inner surface of the upper wall of the bulb. A fluid tight joint is provided between the tube and the lower wall of the bulb, as by flanging the wall of the bulb surrounding the opening and soldering this flanged portion to the tube. Secured in any suitable manner, as by means of soldering, to the lower face of partition 31, is a flanged and cup-shaped member 35 which constitutes a stationary head for a flexible corrugated wall 36 of tubular form, said corrugated wall being secured to the flanged portion 35ª of cup 35. Tube 33 projects through a central aperture in the bottom of cup 35 and is fixedly attached to said cup, as by means of a plate 37, that may be threaded onto the tube, and a soldered connection 38. A dead air space 39 is formed between cup 35 and partition 31 for a purpose to be described hereinafter.

A disk-shaped member 40, is secured as by means of solder to the lower end of corrugated wall 36 and constitutes a rigid movable end wall for the flexible corrugated member.

The bulb 34 is provided with a filling tube 41 in order that a thermosensitive fluid may be introduced into said bulb, and through tube 33, into the expansible and collapsible vessel constituted by stationary end wall 35, flexible wall 36 and movable end wall 40. A sufficient amount of the thermosensitive fluid is introduced to fill the expansible and collapsible vessel 35, 36, 40, the tube 33, and to partially fill bulb 11. Thereafter, filling tube 41 is sealed in any suitable manner, as by means of cork and solder, to prevent the escape of the fluid. Preferably an opening 42 is drilled in tube 33 adjacent the lower wall of bulb 34 so that liquid instead of vapor will be transmitted through said tube from the bulb into the expansible and collapsible bellows.

Pipe 13, which conducts the water from the heating coil in die 5, is threaded into opening 27 of bowl 26 while pipe 17 is threaded into opening 28 of said bowl. The heated water is thus circulated around bulb 34 and the temperature of said water is effective to volatilize the thermosensitive liquid, whereupon the pressure thus formed in the bulb is transmitted through tube 33 to the expansible and collapsible vessel to move head 40. The air space 39 acts as an insulator for the expansible and collapsible vessel, so that the volatile fluid therein is not directly subjected to the variations in temperature to which bulb 34 is subjected.

The movements imparted to head 40, of the collapsible and expansible vessel, by the changes in temperature of the heated water flowing from the coil in die 5, are employed to actuate a steam supply valve 43, whereby the amount of steam flowing through heater 7 is controlled and hence the temperature of the water flowing through head 5 is controlled. For this purpose, the movable head 40 has attached thereto, as by soldering or brazing, a plate 44 which terminates in a downwardly extending plunger 45 that extends into a recess 46 formed in a stem head 47. The lower end of stem head 47 has threaded engagement with a rod 48 that is provided at its lower end with a threaded recess 49 into which is threaded a stem 50 for the valve 43.

A frame 51 is provided for maintaining the housing 52 for valve 43 in operative relation with the expansible and collapsible vessel 35, 36, 40, said frame being provided at its lower end with an opening 53 to receive a threaded bonnet 54 that may be formed integrally with the housing 52. A nut 55 is preferably employed to secure the frame 51 to bonnet 54. Threaded into suitable recesses in the upper end of frame 51 are a plurality of rods 56 which are attached at their upper ends in any suitable maner to the cup 29. Spacing tubes 57 surrouund rods 56 and have engagement at their upper ends with the lower face of cup 29, and at their lower ends with the upper face of frame 51. The valve housing and frame 51 are thus rigidly and adjustably secured in fixed relation with the expansible and collapsible vessel.

Since plunger 45 is only effective to move valve stem 50 downwardly to close valve 43, means are provided for automatically opening the valve when the temperature of the heated water falls and hence when the pressure in bulb 34 is lowered. Yielding means, such as coil spring 58, is preferably employed for automatically opening valve 43, although a weighted lever may be employed, if desired. This spring surrounds rod 48 and bears at its upper end against a spring plate 59 that engages a flange 47ᵃ formed on stem head 47. The lower end of spring 58 engages a spring plate 60 that is supported by an adjustable nut 61 threaded onto the lower end of a sleeve 62 which surrounds rod 48 and which is supported at its lower end in the transversely extending portion 51ᵃ of frame 51. By adjusting the position of nut 61 on threaded sleeve 62, the tension of the spring 58 may be adjusted to vary the temperature at which valve 43 is opened.

Means are preferably provided for limiting the movement of head 40 of the expansible and collapsible vessel. For this purpose a limiting device 63 may be threaded onto the upper end of sleeve 62 in position to coact with the lower end of stem head 47 to positively limit the movement of said head and plunger 45. The limiting device 63 is provided with an opening through which slidably extends the rod 48 and is retained in adjusted position on sleeve 62, as by means of a lock screw 64. Steam supply pipe 20 is connected to a coupling 64 secured to the valve housing 52. When the temperature of the heating water falls, spring 58 acts through stem head 47, rod 48 and valve stem 50 to open valve 43 and admit more steam to the heater 7. A rise in temperature of the heating water above the desired degree results in an expansion of the corrugated vessel whereby the valve is moved to closed position and the supply of steam is diminished or entirely shut off.

There is thus provided means for controlling the platen temperature of leather embossing machines whereby the platen is maintained at an even and predetermined temperature. The apparatus is readily adjustable for various temperatures, as desired, and when adjusted is automatic in operation. Large fluctuations in temperature, resulting from the use of steam-heated platens, are avoided and the device is readily installed on embossing machines now in use without the necessity of skilled labor. The initial cost of installation, and cost of operation after the change is made, will be less than that of systems heretofore employed. After passing through the machine, the water is returned to a feed water heater with little loss in temperature, so that the waste water will be conserved, as well as the heat energy imparted thereto. The apparatus is simple in construction and practical in its operation.

Various changes may be made in the details of construction and in the form of the heating apparatus employed, as will now be apparent to those skilled in the art. While only one embodiment of the invention has been described in detail and illustrated in the drawings, it is to be expressly understood that the drawings are for purposes of illustration only, and that various changes may be made therein without departing from the invention defined in the following claims.

What is claimed is:—

1. Apparatus of the class described comprising, in combination with the die of an embossing machine, a heating coil in said die, a heater, flexible means for conducting water from said heater to said coil, means for supplying a heating fluid to the heater, and means controlled in accordance with the temperature of the water passing through said die for regulating the supply of heating fluid to said heater.

2. In a heating system for an embossing machine die, a heating coil in said die, a water heater, flexible means for conducting water from said heater to said coil, means for supplying steam to said heater, and adjustable means controlling the steam supply to maintain the water passing from said coil at a predetermined temperature.

3. In a heating system for an embossing machine die, a heating coil in said die, a water heater, flexible means for conducting water from said heater to said coil, means for supplying steam to said heater, and thermostatic means controlling the steam supply to maintain the water passing from said coil at a predetermined temperature.

4. A heating system for an embossing machine die comprising a coil carried by said die, a water heater, means for conducting water from said heater to said coil, thermosensitive means including an expansible and collapsible vessel, means for conducting the water from said coil to said thermosensitive means, a conduit for conducting steam to said heater, and a valve in said conduit, said valve being operatively connected to said thermosensitive means and adapted to be operated by said vessel when the temperature of the water passing from said coil departs from a predetermined degree.

5. Apparatus of the class described comprising, in combination with an embossing machine die, a heating coil in said die, a heater, said die being movable relative to said heater, means including flexible joints for conducting water from the heater to said die, means for supplying steam to the heater, and thermostatically controlled means including a valve for regulating the amount of steam supplied to the heater, said last named means being controlled in accordance with the temperature of the water passing through said die.

6. In apparatus of the class described, a die, a heating coil in said die, flexible means for conducting water to and from said coil, means for heating the water as it passes to said coil, and thermostatic means controlled by the temperature of the water discharged from said coil for controlling said heating means.

7. In combination with an embossing machine platen, a heating coil in said platen, a heater, said coil being movable relative to said heater, flexible means for conducting water from the heater to said coil, means for supplying steam to said heater, a valve for controlling said supply means, thermosensitive means for controlling said valve, flexible means for conducting water from said coil to said thermosensitive means, and a valve for controlling the flow of water from said thermosensitive means.

In testimony whereof I have signed this specification.

FRANK C. REEDER.